(12) United States Patent
Huang et al.

(10) Patent No.: US 9,915,722 B2
(45) Date of Patent: Mar. 13, 2018

(54) METHOD AND SYSTEM FOR SIGNAL-BASED LOCALIZATION

(71) Applicant: The Board of Trustees of the Leland Stanford Junior University, Stanford, CA (US)

(72) Inventors: Joseph Huang, Stanford, CA (US); David Millman, Mountain View, CA (US); David Stavens, Atherton, CA (US); Sebastian Thrun, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 14/954,944

(22) Filed: Nov. 30, 2015

(65) Prior Publication Data

US 2016/0216359 A1    Jul. 28, 2016

Related U.S. Application Data (63) Continuation of application No. 13/676,071, filed on Nov. 13, 2012, now Pat. No. 9,201,133.

(60) Provisional application No. 61/558,695, filed on Nov. 11, 2011.

(51) Int. Cl.
| | |
|---|---|
| *G01S 5/02* | (2010.01) |
| *H04W 4/02* | (2009.01) |
| *H04W 24/10* | (2009.01) |
| *G01S 17/42* | (2006.01) |

(Continued)

(52) U.S. Cl.
CPC .............. *G01S 5/0252* (2013.01); *G01S 5/02* (2013.01); *G01S 5/0278* (2013.01); *H04W 4/02* (2013.01); *H04W 24/10* (2013.01); *G01S 17/42* (2013.01); *G01S 17/89* (2013.01); *H04W 64/00* (2013.01)

(58) Field of Classification Search
CPC . G01S 5/02; G01S 17/06; G01S 17/42; G01S 5/0242; G01S 5/0278; G01S 13/89; G01S 17/58; H04W 4/043; H04W 4/008; H04W 4/02; H04W 64/00; H04W 4/04; H04W 4/027

See application file for complete search history.

(56) References Cited

U.S. PATENT DOCUMENTS

| | | | |
|---|---|---|---|
| 2005/0176442 A1* | 8/2005 | Ju | G01S 5/0252 455/456.1 |
| 2008/0085692 A1* | 4/2008 | Hart | H04W 16/20 455/187.1 |
| 2011/0125323 A1* | 5/2011 | Gutmann | G05D 1/0234 700/258 |

OTHER PUBLICATIONS

WiSLAM: improving FootSLAM with WiFi by Bruno et al., dated Sep. 2011.*

(Continued)

*Primary Examiner* — Daniel Lai
(74) *Attorney, Agent, or Firm* — KPPB LLP (57) ABSTRACT

In an embodiment of the present invention, a GraphSLAM-like algorithm for signal strength SLAM is presented. This algorithm as an embodiment of the present invention shares many of the benefits of Gaussian processes yet is viable for a broader range of environments since it makes no signature uniqueness assumptions. It is also more tractable to larger map sizes, requiring $O(N^2)$ operations per iteration. In the present disclosure, an algorithm according to an embodiment of the present invention is compared to a laser-SLAM ground truth, showing that it produces excellent results in practice.

25 Claims, 9 Drawing Sheets

(51) Int. Cl.
*H04W 64/00* (2009.01)
*G01S 17/89* (2006.01)

(56) References Cited

OTHER PUBLICATIONS

WiFi GraphSLAM in 1-D by Jose Roberto Ayala Solares, dated Aug. 2, 2011.*

* cited by examiner

METHOD AND SYSTEM FOR SIGNAL-BASED LOCALIZATION

CROSS-REFERENCE TO RELATED APPLICATIONS

This application claims priority to U.S. Provisional Application No. 61/558,695 filed Nov. 11, 2011, and to U.S. Pat. No. 9,201,133 filed Nov. 13, 2012, which are hereby incorporated by reference in their entirety for all purposes.

FIELD OF THE INVENTION

The present invention generally relates to the field of localization and mapping.

BACKGROUND OF THE INVENTION

The widespread deployment of wireless networks presents an opportunity for localization and mapping using signal-strength measurements. Wireless networks are ubiquitous, whether in the home, office, shopping malls, or airports.

Recent work in signal-strength-based simultaneous localization and mapping (SLAM) uses Gaussian processes latent variable models (GP-LVM). This work, however, requires that maps are limited to very specific predefined shapes (e.g. narrow and straight hallways) and WIFI fingerprints are assumed unique at distinct locations. Generally, in the absence of any odometry information, arbitrary assumptions must be made about human walking patters and data association.

GraphSLAM is a technique used in the robotics community for simultaneously estimating a trajectory and building a map offline. It shares many benefits of Gaussian processes, but can be applied to a broader range of environments. Below, it is shown how wireless signal strength SLAM can be formulated as a GraphSLAM problem. By using GraphSLAM, limitations of traditional approaches are addressed to improve runtime complexity from $O(N^3)$ to $O(N^2)$, where N is the dimensionality of the state space, i.e., the number of poses being estimated.

In both GraphSLAM and Gaussian processes, measurement likelihoods are modeled as Gaussian random variables. Gaussian processes can improve their model fit by moving points away from each other. To prevent these trivial solutions, GP-LVM methods require special constraints. In the case of signal strength SLAM, the special constraints force similar signal strengths to similar locations. GraphSLAM requires no special constraints. This makes GraphSLAM suitable to a wider range of real-world environments.

An appeal of GraphSLAM is that it reduces to a standard non-linear least squares problem. This gives GraphSLAM access to widely used and well-studied techniques for its optimization. A parameterization of the state space for typical mobile phone applications is presented below.

If wireless signal strength maps are determined ahead of time, Monte Carlo localization methods can achieve high accuracy indoor localization. In a traditional approach, the signal strength map is discretized into a spatial grid and, combined with contact sensing, obtains 0.25 m accuracy using standard Monte Carlo methods while improving convergence time over contact sensing alone. In another approach, spatial discretization of the signal strength map is preformed and combine with WIFI with a low-cost image sensor to localize within 3 m. In traditional approaches, however, the process for obtaining signal strength maps is expensive and time consuming.

Outdoor applications have been handled by GPS and/or attenuation model or range-based SLAM methods. Other indoor signal-strength-based localization research relies on extensive training phases or incorporates other features of the signal such as time-of-arrival or angle-of-arrival measurements. In most pedestrian applications, however, such data is inaccessible to the general public without additional infrastructure costs. The implications of low-cost signal-strength SLAM are especially meaningful for large (indoor) GPS deprived environments such as shopping malls, airports, etc. where wireless internet infrastructure is readily accessible.

Existing wireless mapping techniques model the signal data in different ways. Some traditional techniques assume a model of the signal propagation. Others use a connectivity graph of predetermined cells to localize coarsely. Since these techniques rely on pre-existing information about the environment, they do not handle the problem of mapping in unknown locations.

The current state of the art uses Gaussian processes to determine a map of signal strength without modeling the propagation from transmitting nodes explicitly. Gaussian processes are applied to WiFi-SLAM under a specific set of assumptions.

SUMMARY OF THE INVENTION

The widespread deployment of wireless networks presents an opportunity for localization and mapping using only signal-strength measurements. The current state of the art is to use Gaussian process latent variable models (GP-LVM). This method relies on a signature uniqueness assumption which limits its applicability to only signal-rich environments. Moreover, it does not scale computationally to large sets of data, requiring $O(N^3)$ operations per iteration.

In an embodiment of the present invention, a GraphSLAM-like algorithm for signal strength SLAM is presented. This algorithm shares many of the benefits of Gaussian processes, yet is viable for a broader range of environments since it makes no signature uniqueness assumptions. It is also more tractable to larger map sizes, requiring $O(N^2)$ operations per iteration. Below, this algorithm is compared to a laser-SLAM ground truth, showing that it produces excellent results in practice.

Figure 1A:
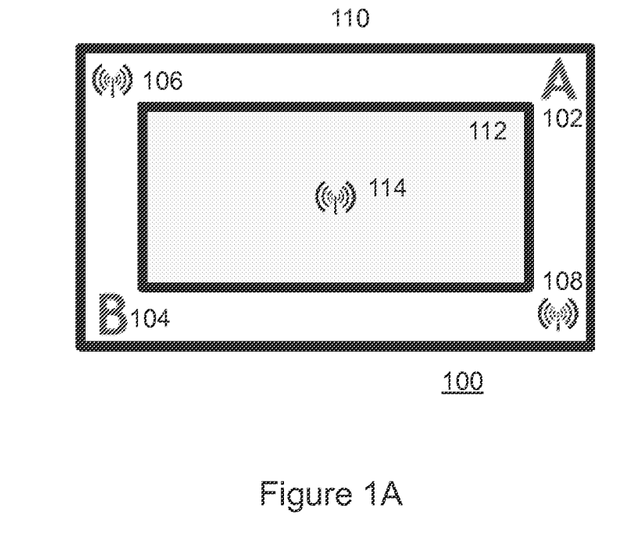
FIGS. 1A and 1B are illustrations of deployments of wireless nodes.
Figure 1B:
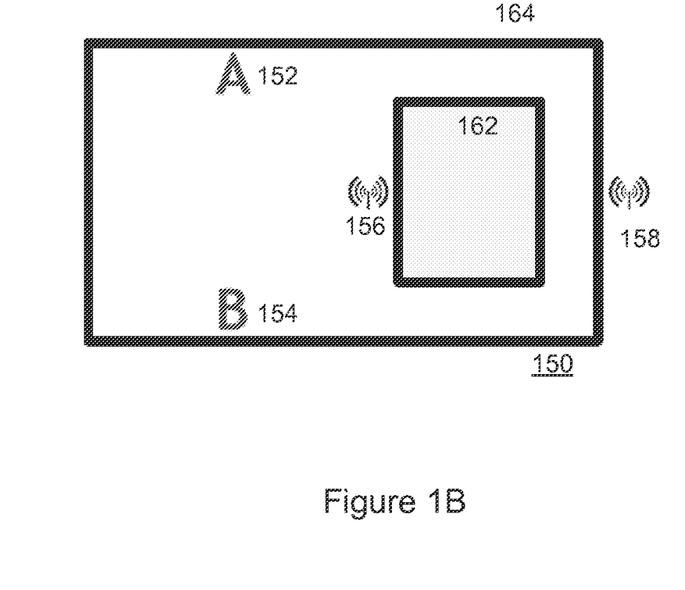

In an embodiment of the present invention, the restriction that similar signal strength fingerprints/signatures all correspond to a similar location on the map is lifted. If the geographic distribution of access points is sparse, there are more spatial configurations where the fingerprint uniqueness assumption breaks down. As illustrated in FIGS. 1A and 1B, real-world hypotheses are often multi-modal.

Shown in FIGS. 1A and 1B are two examples 100 and 150, respectively, of wireless node deployment. In each example, location A (102 and 152, respectively) and location B (104 and 154, respectively) share the same signal strength signature/fingerprint. But the configuration of the buildings 110 and 164 are different. For example, note spaces 112 and 164 in FIGS. 1A and 1B, respectively, as well as the locations of signal sources 106, 108, and 114 in FIG. 1A and signal sources 156 and 158 in FIG. 1B. More generally, at indoor scales, signal strength can often be relatively invariant over long regions of open areas in line-of-sight directions. Especially at lower signal strengths, due to the log relationship between signal strength and distance, signal strength can be almost completely invariant over very large sections of space.

Relaxing this requirement brings modern signal-strength-based SLAM to sparse signal environments. Furthermore, explicitly mapping similar signal strengths to similar locations hurts scalability: as the dataset grows, the risk increases of erroneous measurements being incorrectly mapped by this constraint. Since such mappings are hard constraints, these errors are completely unrecoverable. The current state of the art cannot achieve signal-strength SLAM without relying upon explicit fingerprint uniqueness back-constraints. In a traditional approach, the GP-LVM method is only reasonable in dense environments. The method of an embodiment of the present invention does not make any assumptions of fingerprint uniqueness. Therefore, signal density or sparsity, which influences fingerprint uniqueness, is not a concern in an embodiment of the present invention.

In order to provide a SLAM solution suitable for both rectilinear corridor-type environments as well as open atrium-type environments, in an embodiment of the present invention, low-cost IMU data is incorporated. Introducing motion measurements makes the sensor model general enough to apply to a wide range of crowdsourcing applications. In this embodiment, subjects need not explicitly cooperate with predetermined walking patterns, consistent walking speeds, etc. Motion sensors may also make the problem easier. The viability of low-cost WiFi SLAM according to an embodiment of the present invention is demonstrated below and compared to a laser-SLAM implementation.

In an embodiment, the scalability of modern signal strength SLAM is improved for larger datasets. In this embodiment, the proposed GraphSLAM based method is shown to have better runtime complexity than Gaussian process latent variable models. This method is demonstrated to produce useful results on real-world data.

Our results compare the GraphSLAM approach for WiFi SLAM against a LIDAR-based GraphSLAM implementation. Using real-world datasets, a localization accuracy of between 1.75 m and 2.18 m over an area of 600 square meters is demonstrated. The manner in which the resultant maps are directly applicable to online Monte Carlo Localization is discussed below.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION OF THE INVENTION

Figure 5:
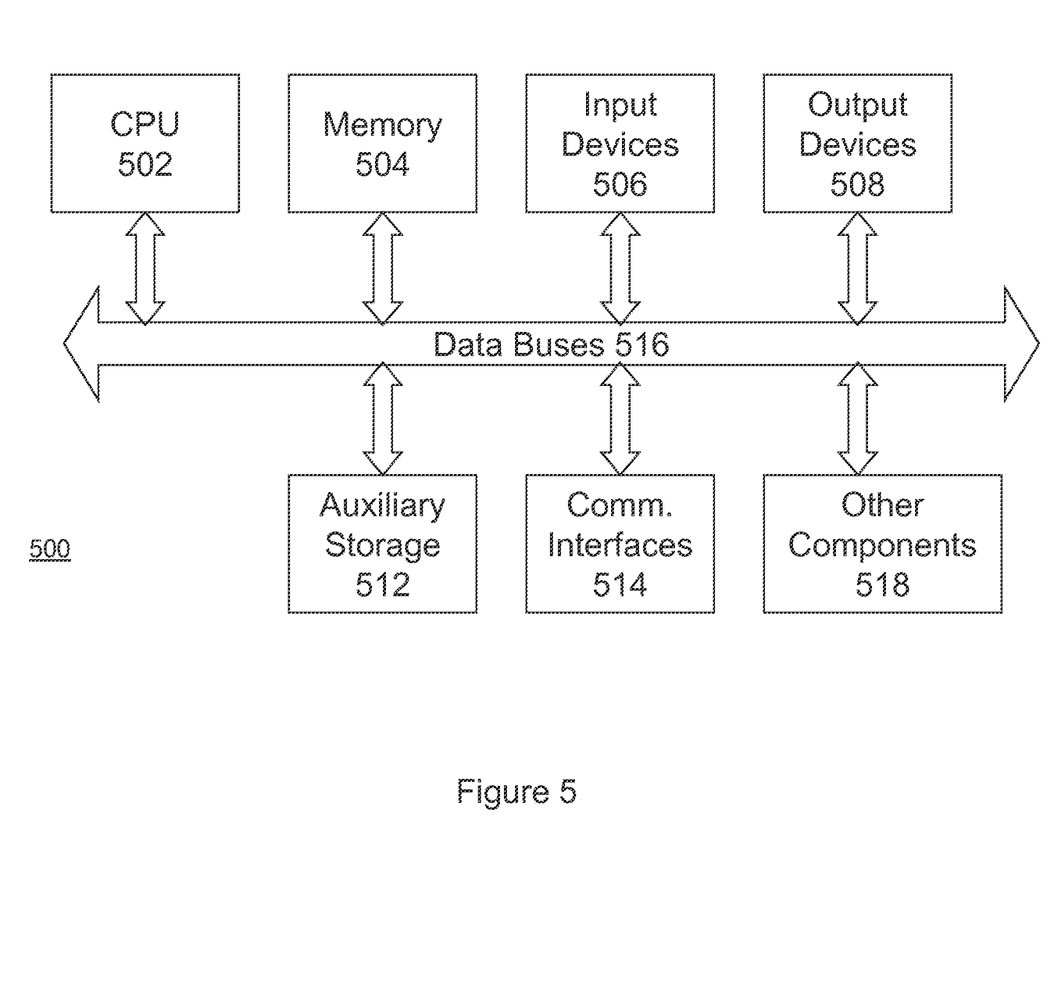
FIG. 5 is a block diagram of a computer system on which embodiments of the present invention can be implemented.

Among other things, the present invention relates to methods, techniques, and algorithms that are intended to be implemented in a digital computer system 100 such as generally shown in FIG. 5. Such a digital computer is well-known in the art and may include the following.

Computer system 500 may include at least one central processing unit 502 but may include many processors or processing cores. Computer system 500 may further include memory 504 in different forms such as RAM, ROM, hard disk, optical drives, and removable drives that may further include drive controllers and other hardware. Auxiliary storage 512 may also be include that can be similar to memory 504 but may be more remotely incorporated such as in a distributed computer system with distributed memory capabilities.

Computer system 500 may further include at least one output device 508 such as a display unit, video hardware, or other peripherals (e.g., printer). At least one input device 506 may also be included in computer system 500 that may include a pointing device (e.g., mouse), a text input device (e.g., keyboard), or touch screen.

Communications interfaces 514 also form an important aspect of computer system 500 especially where computer system 500 is deployed as a distributed computer system. Computer interfaces 514 may include LAN network adapters, WAN network adapters, wireless interfaces, Bluetooth interfaces, modems and other networking interfaces as currently available and as may be developed in the future.

Computer system 500 may further include other components 516 that may be generally available components as well as specially developed components for implementation of the present invention. Importantly, computer system 500 incorporates various data buses 516 that are intended to allow for communication of the various components of computer system 500. Data buses 516 include, for example, input/output buses and bus controllers.

Indeed, the present invention is not limited to computer system 500 as known at the time of the invention. Instead, the present invention is intended to be deployed in future computer systems with more advanced technology that can make use of all aspects of the present invention. It is expected that computer technology will continue to advance but one of ordinary skill in the art will be able to take the present disclosure and implement the described teachings on the more advanced computers or other digital devices such as mobile telephones or smart televisions as they become available. Moreover, the present invention may be implemented on one or more distributed computers. Still further, the present invention may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

For example, embodiments of the present invention can be implemented in cellular telephones including smart telephones that include the necessary computing and communications capabilities. Also, embodiments of the present invention can be implemented in tablet computers with the necessary hardware and software capabilities. More broadly, embodiments of the present invention can be implemented in general purposes devices with the necessary capabilities as described herein. Still other embodiments of the present invention can be implemented in stand-alone devices that are especially configured to implement the teachings of the present invention.

The present disclosure provides a detailed explanation of the present invention with detailed explanations that allow one of ordinary skill in the art to implement the present invention into a computerized method. Certain of these and other details are not included in the present disclosure so as not to detract from the teachings presented herein but it is understood that one of ordinary skill in the at would be familiar with such details.

Traditional Graphslam

The GraphSLAM family of techniques are used in the robotics community for simultaneously estimating a trajectory and building a map offline. Such techniques have been used in applications in computer vision and robotics. The signal strength SLAM problem is reduced to an instance of GraphSLAM as discussed below.

GraphSLAM is traditionally formulated as a network of Gaussian constraints between robot poses and landmarks. Measurements are assumed to contain only additive Gaussian noise and to be conditionally independent given the world states. For each measurement $Z_i$ from any sensor, a state-to-measurement mapping function $h_i(X)$ describes the true measurement that would have taken place if the value of the state variables were known:

$$Z_i = h_i(X) + \epsilon_i$$

where $$X = \{\vec{x}_{t_1}, \vec{x}_{t_2}, \ldots, \vec{m}_1, \vec{m}_2, \ldots\}$$

represents the collection of all state variables (e.g. robot locations $\{\vec{x}_t\}$ and landmark locations $\{\vec{m}_i\}$). The measurement likelihood as a function of $z_i$ is Gaussian with mean $h_i(X)$ and variance Var $\{\epsilon_i\}$.

Motion Model

The typical GraphSLAM motion model can be expressed as state-to-measurement mappings. For example, a pedometry measurement on the interval between time $t_i$ and $t_{i+1}$ is related to the state space by the function $$h_i^{pedometry}(X) = \|\vec{x}_{t_{i+1}} - \vec{x}_{t_i}\|_2$$

Similarly, angular velocity measurements correspond to $$h_i^{gyro}(X) = \frac{a\tan2(\vec{x}_{t_{i+1}} - \vec{x}_{t_i}) - a\tan2(\vec{x}_{t_i} - \vec{x}_{t_{i-1}})}{\Delta t}$$

where $\Delta t = (t_{i+1} - t_{i-1})/2$. Note that implementations must be careful to account for headings that cross over from $-\pi$ to $+\pi$ and vice versa.

The definition of a state-to-measurement mapping h together with the variance of the corresponding sensors noise, $\sigma_\epsilon = Var(\epsilon)$, describes the GraphSLAM measurement likelihood function for each sensor. The methods presented herein as embodiments of the present invention will work with any class of sensors. Pedometry and gyroscopes are merely used as examples here because they are the sensors of the sample dataset as discussed below.

Wifi Graphslam

The state-to-measurement mapping for the $i^{th}$ signal strength measurement is defined to be $$h_i^{WiFi}(X) = \vec{\beta}_i^T \vec{z}^{WiFi}$$

$$\vec{\beta}_i = \vec{w}_i - [\vec{w}_i]_i \hat{e}_i, \|\vec{\beta}_i\|_1 = 1$$

For notational convenience, $\vec{z}^{WiFi}$ is the vector of all signal strength measurements. $\vec{\beta}_i$ excludes the $i^{th}$ element from $\vec{w}_i$. $\vec{w}_i$ is the vector of interpolation weights for $h^{WiFi}$. The notation $[\vec{a}]_i$ is shorthand for the $i^{th}$ element of the vector $\vec{a}$, and $\hat{e}_i$ is the unit vector with all elements zero except the $i^{th}$ element. Note that $h_i$ does not interpolate the $i^{th}$ elements zero except the $i^{th}$ element. This allows the measurement model to operate in sparse WIFI environments.

At most distances from a transmission node, propagating radio waves are expected to have nearly the same power within any small region of free space. Over larger regions across non-free space the relationship between nearby signal strengths is highly dependent on building structure/architecture. Without a model for building structure, a method according to an embodiment of the present invention interpolates over small regions likely to be free space.

Figure 2A:
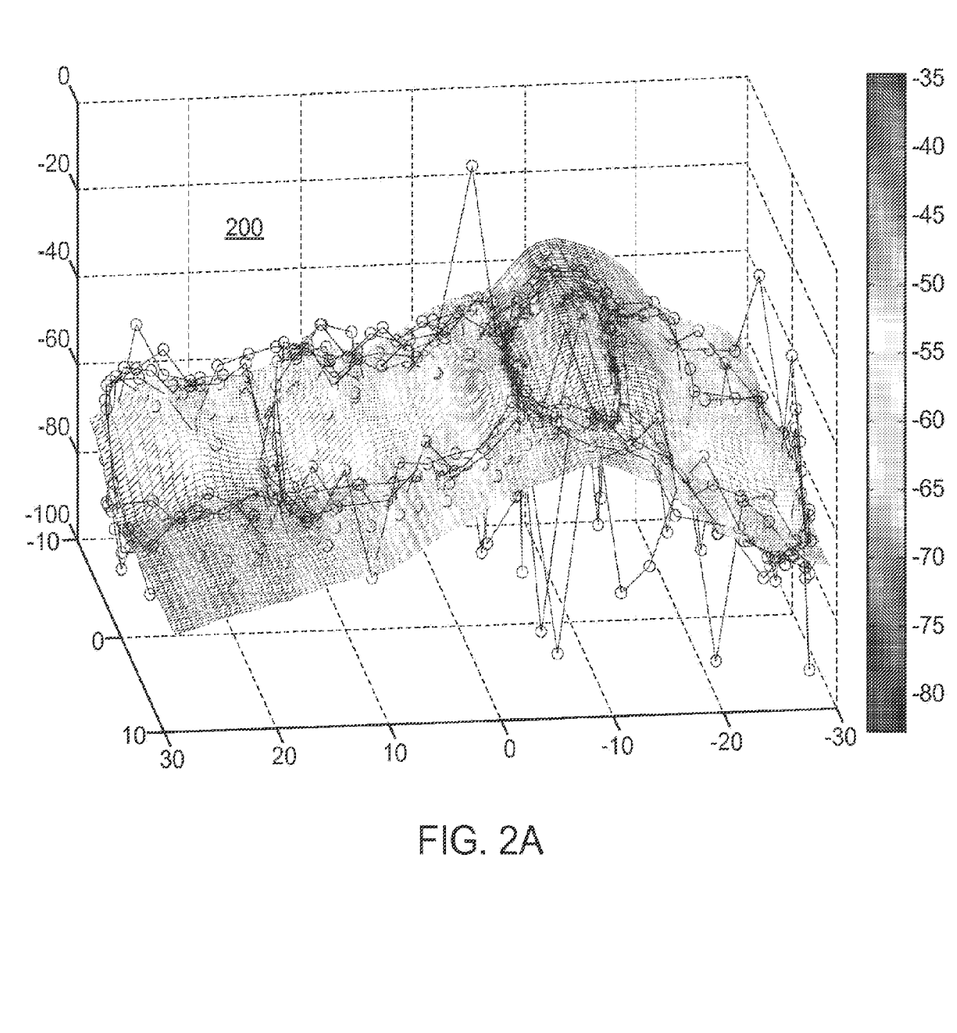
FIGS. 2A and 2B are sample plots of $h^{WiFi}$, Gaussian weighted interpolation of signal-strength measurements, elevated over a grid with scale parameter $\tau=2.2$ m, according to an embodiment of the present invention.
Figure 2B:
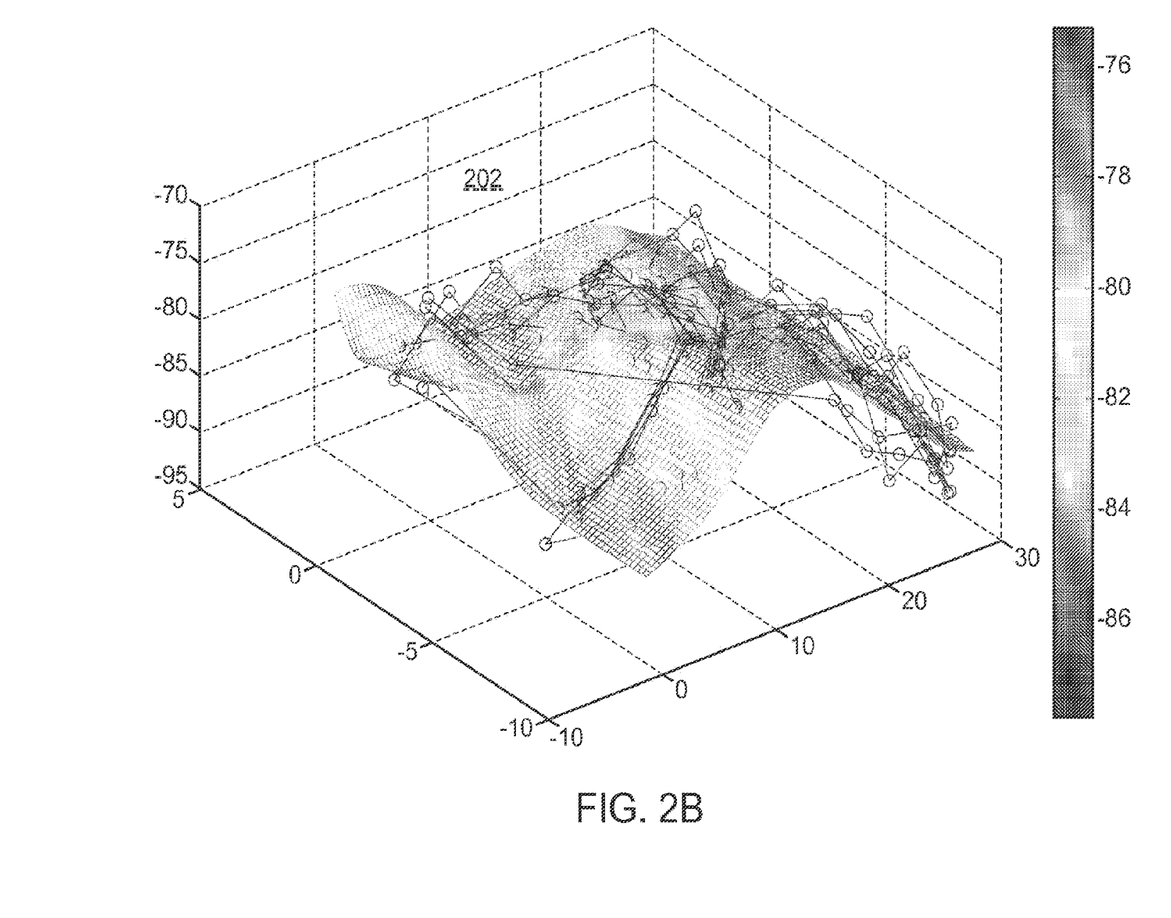

The quantity $[\vec{w}_i]_j$ can be considered as related to the probability that location i and location j are inter-polatable, e.g., nearby and separated by only free space. In practice, at reasonable scales and in lieu of additional knowledge, Gaussian interpolation weights are a popular kernel choice and have been used with success to interpolate WIFI signal strengths as well as in other machine learning applications.

$$[\vec{w}_i]_j \propto exp\left(-\frac{1}{2\tau^2}\|\vec{x}_{t_i} - \vec{x}_{t_j}\|_2^2\right)$$

where $\tau$ is a scale parameter, related roughly to the distance between walls (e.g., 95% of walls can be considered at least $2\tau$ away from measurement locations). In an embodiment, $\tau$ can be learned from training data (experimental value of $\tau$ for our dataset was approximately 2.2 meters). FIGS. 2A and 2B illustrate typical behavior of this signal interpolation method. More particularly, FIGS. 2A and 2B are sample plots 200 and 202, respectively, of $h^{WiFi}$, Gaussian weighted interpolation of WIFI points, evaluated over a grid with scale parameter $\tau = 2.2$ m, according to an embodiment of the present invention. As shown, black circles denote measured values. The vertical axis represents signal strength (dBm) and the horizontal axes represent spatial location.

With this formulation, for any specific measured value $z_i$, the following is evaluated:

$$z_i - h_i(X) = \varepsilon_i \Rightarrow \begin{cases} E\left[\vec{z}_i^{WiFi} - \sum_j [\vec{\beta}_i]_j z_j^{WiFi}\right] = 0 \\ Var(\varepsilon_i^{WiFi} + h_i^{WiFi}(X)) = \left(1 + \|\vec{\beta}_i\|_2^2\right) Var(\varepsilon^{WiFi}) \end{cases}$$

The WIFI measurement likelihood, as a function of $z_i$, is Gaussian with mean $h_i(X)$ and variance $$(1+\|\vec{\beta}_i\|_2^2)\sigma_\epsilon^2$$

where $$\sigma_\epsilon^2 = \text{Var}(\epsilon^{WiFi})$$

denotes the measurement noise variance associated with the WIFI sensor. In practice, $$\|\vec{\beta}_i\|_2^2 \ll 1$$

for any sufficiently dense dataset (recall that $\|\vec{\beta}_i\|_1 = 1$).

Observe that this formulation is free of any restrictions on fingerprint uniqueness, and is equally applicable to both sparse and dense signal environments.

Embodiments of the present invention can be implemented using hand-held devices such as cellular telephones, sometimes called smart-phones, tablet computers, or other computing devices having signal receivers such as WIFI transceivers. In such embodiments, the described algorithms can be implemented on the hand-held device itself or can be implemented on another computing device that is in communication with the hand-held device. Likewise, the collection of signal information can be performed on the handheld device itself or by other devices. Still other embodiments may distribute certain computational steps between a hand-held device and a separately networked computer. Computer networks in such cases can include cellular networks. Many other embodiments are possible as would be known to those of ordinary skill in the art upon understanding the teachings of the present disclosure.

Relationship to Gaussian Processes

Here, a few key differences between our measurement model according to an embodiment of the present invention and Gaussian processes are discussed. In Gaussian processes, the model fit to the WIFI measurements, as a function of $z_i$, has mean:

$$h_i^{GP}(X) = \vec{k}_i^T (K+\sigma_\epsilon^2 I)^{-1} \vec{z}^{WiFi}$$

$$h_i^{WiFi}(X) = \vec{\beta}_i^T \vec{z}^{WiFi}$$

$\sigma_\epsilon^2$ is measurement noise variance associated with the WIFI sensor. $k_i$ and $K$ come from the choice of kernel weighting function.

The comparison to GraphSLAM is most clear when $$[\vec{w}_1, \vec{w}_2, \ldots] \propto K,$$

a square matrix whose $j^{th}$ column is $k_j \propto \vec{u}'_j$. The two key differences in the measurement model presented here are the omission of the $(K+\sigma_\epsilon^2 I)^{-1}$ term and exclusion of $z_i^{WiFi}$ from $\vec{z}^{WiFi}$ in the weighted average, i.e. $[\vec{\beta}_i]_i = 0$.

Omission of $(K+\sigma_\epsilon^2 I)^{-1}$

The $(K+\sigma_\epsilon^2 I)^{-1}$ term can be thought of as a whitening transform on the weighted observations and their weights. If, for example, ten observations appear at the same location $\vec{x}$ and the same value $z$, they would collectively only be given one "vote" in the weighted average, rather than ten. This makes sense when attempting to make statistically consistent function value estimates over large distances. Only at small scales can signal strengths be averaged meaningfully without physical modeling of the surrounding materials. At these scales, giving (nearby) past measurements each an "equal vote" provides a larger sample size with which to predict future measurements, which is the methodology employed within the GraphSLAM formulation. Formally, treating past measurements in this way is equivalent to the approximation of $$e^{-\frac{1}{2\tau^2}} \ll \sigma_\varepsilon^2$$

for a Gaussian Process, e.g., the measurement noise dominates innate signal variance. At wireless frequencies this is a reasonable assumption. Error in measured signal strength is tightly coupled to innate signal variance by the dynamics of the environment. Distinguishing measurement noise from signal variance would require extensive prior information of building materials, population distributions, etc.

Furthermore, the size of $K$ grows quadratically in the size of the dataset (number of measured locations, $N$). The need to invert $K$ when computing $h$ and its derivatives makes each iteration an $O(N^3)$ operation. This is the main reason that it is difficult to scale Gaussian process techniques to larger datasets and omitting this term in the interpolation allows GraphSLAM to achieve an $O(N^2)$ asymptotic runtime and in turn makes the GraphSLAM technique easier to scale to larger datasets.

It should be noted that both GraphSLAM and Gaussian process latent variable models can improve their runtime complexities by means of sparsification or other approximation methods.

Exclusion of $z_i^{WiFi}$

The second key difference in interpolation methods is that a model fit according to an embodiment of the present invention always excludes $z_i^{WiFi}$ from $\vec{z}^{WiFi}$ when computing the weighted average for $h_i^{Wifi}$. Here, an attempt is made to determine the model fit, or self-consistency, of observing certain measurements. In both GraphSLAM and Gaussian processes, model fit/measurement likelihood is modeled as Gaussian random variables/vectors and as such are defined by their mean and (co)variance. That is, it is desired to determine the fit of $z_i^{WiFi}$. The fit of $z_i^{WiFi}$ will be determined by a certain distribution $p$. In this setting, it would not make sense to use $z_i^{WiFi}$ itself to compute the parameters of $p$.

As a consequence of including $z_i^{WiFi}$, its own model fit definition, for any fixed $\tau$, the latent space optimization of GP-LVM can improve model fit by moving all points away from each other. To circumvent this behavior, GP-LVM methods almost always require explicit signal strength→location back constraints or carefully selected priors. The GraphSLAM approach according to an embodiment of the invention, on the other hand, will require no hard constraints. Excluding $z_i^{WiFi}$ causes measurements to be attracted to similar neighboring measurements. This makes GraphSLAM as an embodiment of the present invention suitable to a wider range of real-world environments, including those where wireless signatures are not rich enough to guarantee uniqueness but still provide enough information to augment an existing SLAM implementation.

V. Non-Linear Least Squares

One of the primary appeals of GraphSLAM methods in general is that minimizing the negative log posterior reduces to standard non-linear least squares, giving GraphSLAM access to a vast set of widely used and well-studied techniques for its optimization.

Here, $h^{pedometry}$, $h^{gyro}$, $h^{WiFi}$, together with Var($\epsilon^{pedometry}$), Var($\epsilon^{gyro}$), Var($\epsilon^{WiFi}$) are needed to formulate the least squares problem:

$$-\log \prod_i P_{z_i}(z_i | X) = \frac{1}{2} \sum_i [z_i - h_i(X)]^T [\text{Var}(\epsilon_i)]^{-1} [z_i - h_i(X)]$$

Depending on the application, environment, or domain, a uniform prior and maximize the likelihood can be assumed, or any number of Gaussian priors can be added (e.g., inertial priors or smoothness constraints). For the experiments discussed below, uniform priors have been assumed and the data likelihood has been maximized directly.

Solvers

In general, non-linear least squares is a well-studied problem in numerical optimization communities and any number of solvers can be used instead. Methods such as gradient/steepest descent, Levenberg-Marquardt, BFGS and many Conjugate gradient based methods are readily available and can be applied directly.

Typical solvers depend on local linearization to iterate toward an optimum. Let $J_{h_i}(X)$ denote the derivatives of h with respect to each state variable in X (each row of J is a gradient of h). For example, if this Jacobian is known, any initial guess $X_0$ can be iteratively refined by solving $$X_{new} := X_0 + \left[\sum_{h_i} J_{h_i}^T \Omega_{h_i} J_{h_i}\right]^{-1} \left[\sum_{h_i} J_{h_i}^T \Omega_{h_i}(z_i - h_i(X_0))\right]$$

$$\Omega_{h_i} = [\text{Var}(\epsilon_i)]^{-1}$$

with $J_{h_i}$ evaluated at $X_0$ on each iteration. This is known as Gauss-Newton iteration.

Our results in as described below are obtained using standard Gauss-Newton iteration. In our case, z and h are always scalar valued so $J_{h_i}(X) = \nabla h_i$ is a row vector and $\Omega_{h_i} = \sigma_{h_i}^{-2}$ is a scalar. Each iteration, then, is equivalent to solving the overconstrained matrix system of the form $A\overline{\Delta} = \overline{h}$ $$\begin{bmatrix} - & \sigma_{h_1}^{-1} \nabla h_1 & - \\ - & \sigma_{h_2}^{-1} \nabla h_2 & - \\ & \vdots & \\ - & \sigma_{h_N}^{-1} \nabla h_N & - \end{bmatrix} \vec{\Delta} = \begin{bmatrix} \sigma_{h_1}^{-1}(z_1 - h_1) \\ \sigma_{h_2}^{-1}(z_2 - h_2) \\ \vdots \\ \sigma_{h_N}^{-1}(z_N - h_N) \end{bmatrix}$$

and updating $X_{new} := X_0 + \overline{\Delta}$.

State Space

The convergence characteristics of GraphSLAM, as an embodiment of the present invention, depend on the linearizability of h. In an embodiment, some effort is made to transform the state space to improve linearization. In certain settings, reformulation of a GraphSLAM state space has lead to dramatically improved performance and result quality. So far, all three of the state-to-measurement mappings $h^{pedometry}$, $h^{gyro}$ and $h^{WiFi}$, are non-linear functions if the world state is represented as $X = \{\bar{x}_{t_1}, \bar{x}_{t_0}, \ldots\}$, describing robot location at each point in time.

Due to the exponential terms created by the interpolation weight kernel, $h^{WiFi}$ will be non-linear regardless of the state space parameterization. The state space is solved in terms of the headings $\{\phi_1, \phi_2, \ldots, \phi_{N-1}\}$ and $\{d_1, d_2, \ldots, d_{N-1}\}$ between each WIFI scan, e.g., $$\vec{x} = \begin{bmatrix} \sum d \cos(\phi) \\ \sum d \sin(\phi) \end{bmatrix}. \text{ Then,}$$

$$h_{pedometry}(X) = d_i$$

$$h_{gyro}(X) = \phi_{i+1} - \phi_i$$

which linearize with infinite radius of convergence. This allows for eliminating linearization error in all but one of the sensors.

To compute derivatives $\nabla_{\{\vec{d},\vec{\phi}\}} h_{WiFi}(X)$:

$$\nabla_{\{\vec{d},\vec{\phi}\}} h_{WiFi}(X) = [\nabla_{\{\vec{x}\}} h_{WiFi}(X)] J_{\{\vec{x}\}}(\{\vec{d}, \vec{\phi}\})$$

$$\nabla_{\{\vec{x}\}} h_{WiFi}(X) = \sum_j [\vec{\beta}_i]_j (z_j - h_i) \frac{-1}{2\tau^2} \left(\nabla_{\{\vec{x}\}} \|\vec{x}_j - \vec{x}_i\|^2\right)$$

The gradient of $h_{WiFi}(X)$ under this 'heading and distance' parametrization is fast to compute in practice. This is because the columns of $J_{\{\vec{x}\}}(\{\vec{d},\vec{\phi}\})$ are always constant valued with leading zeros, and elements of $\nabla_{\{\vec{x}\}} \|\vec{x}_j - \vec{x}_i\|^2$ are all zero except for those corresponding to the $$\frac{\partial}{\partial \vec{x}_i} \text{ or } \frac{\partial}{\partial \vec{x}_j}$$

elements.

EXPERIMENTAL RESULTS

Data

To evaluate the embodiments of the present invention, a trace was used of 536 WIFI scans captured over 17 minutes across a 60 m×10 m area of one floor of a university building. The trajectory covers about 1.2 km of travel distance. This dataset contains corresponding pedometry data, readings from a MEMS gyroscope, and an accompanying LIDAR-derived ground truth. The ground truth has been derived by processing the LIDAR, pedometry, and gyroscope measurements through off-the-shelf LIDAR SLAM.

Maximizing the likelihood of the dataset over parameter τ yields an optimal value of 2.2 m (e.g., the average distance to a wall in all directions is roughly 4.4 m for 95% of measurement locations), but in our experiments, any values from τ≈1.5 m through τ≈3.5 m all produce good results.

Results

The ground truth is accurate to about 10 cm. The ground truth and LIDAR are used only to evaluate the results. GraphSLAM requires no labeled data.

Figure 3A:
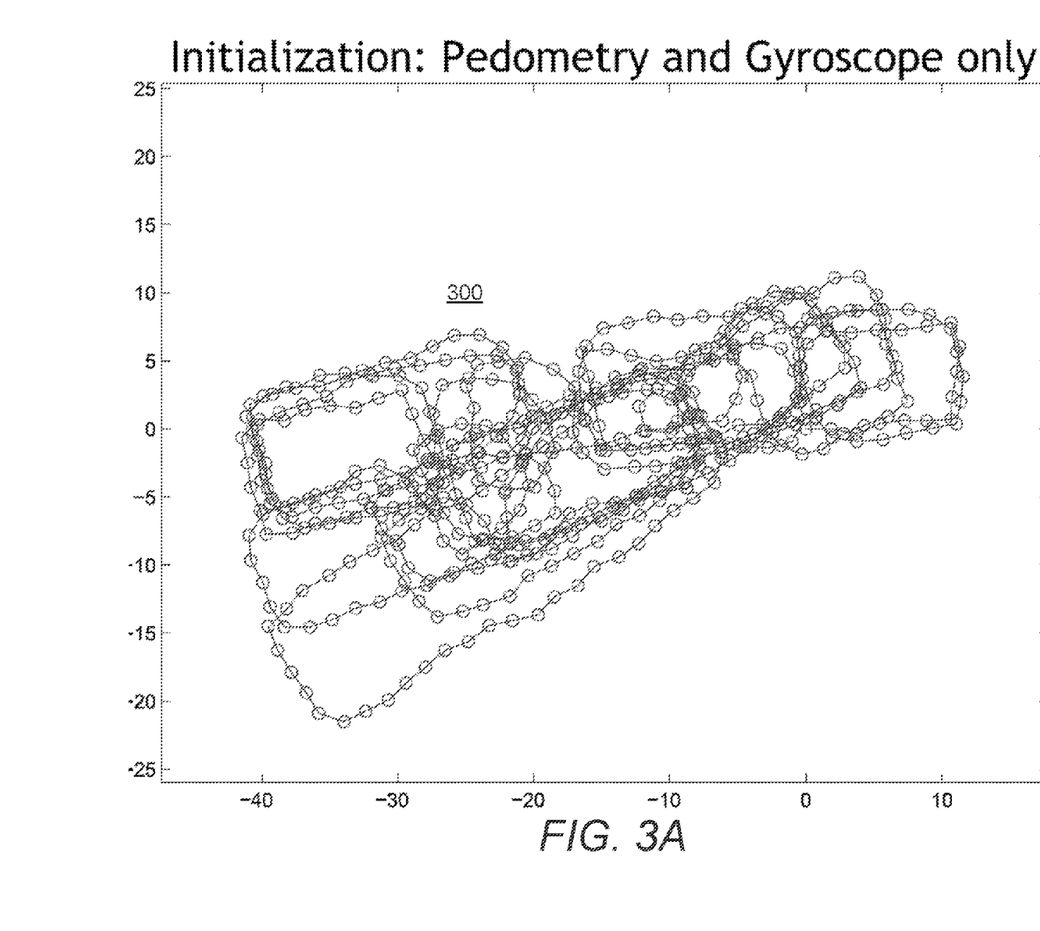
FIGS. 3A-3C are graphs that compare GraphSLAM initialization and resulting optimized GraphSLAM posterior as well as the unaligned ground truth trajectory is provided for reference.
Figure 3B:
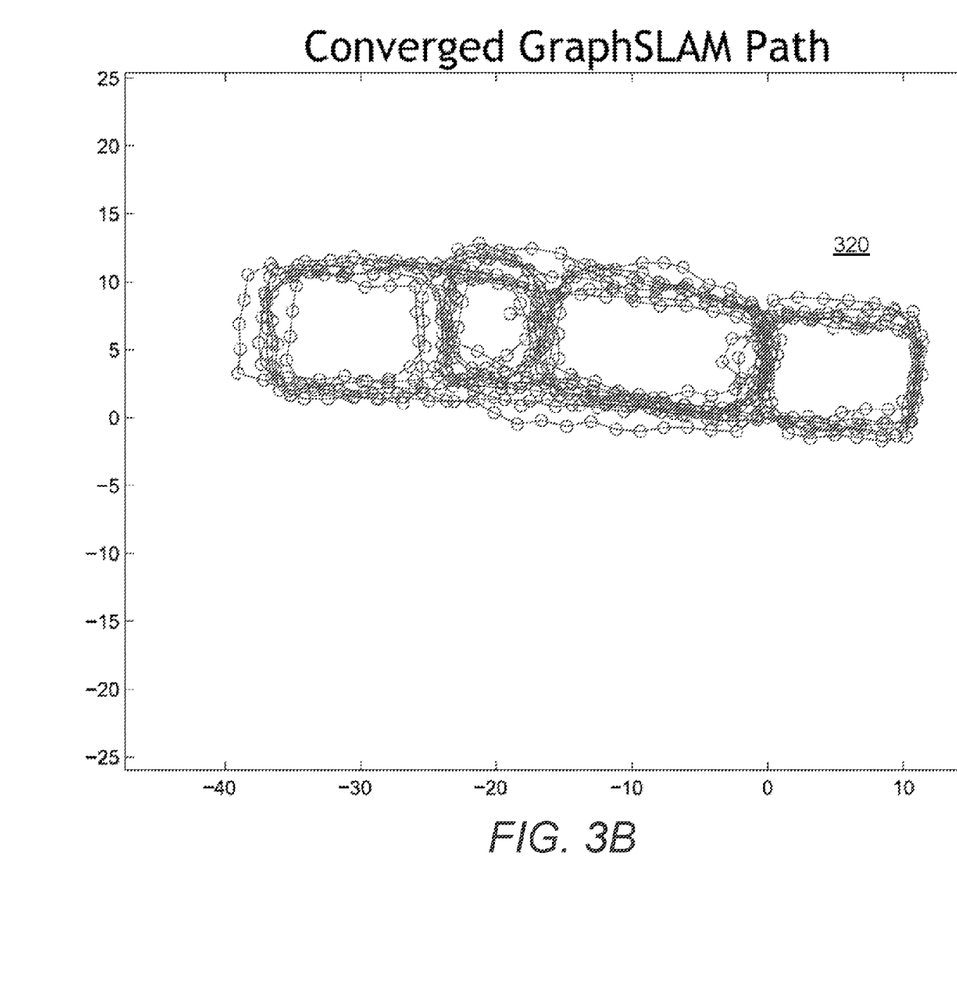
Figure 3C:
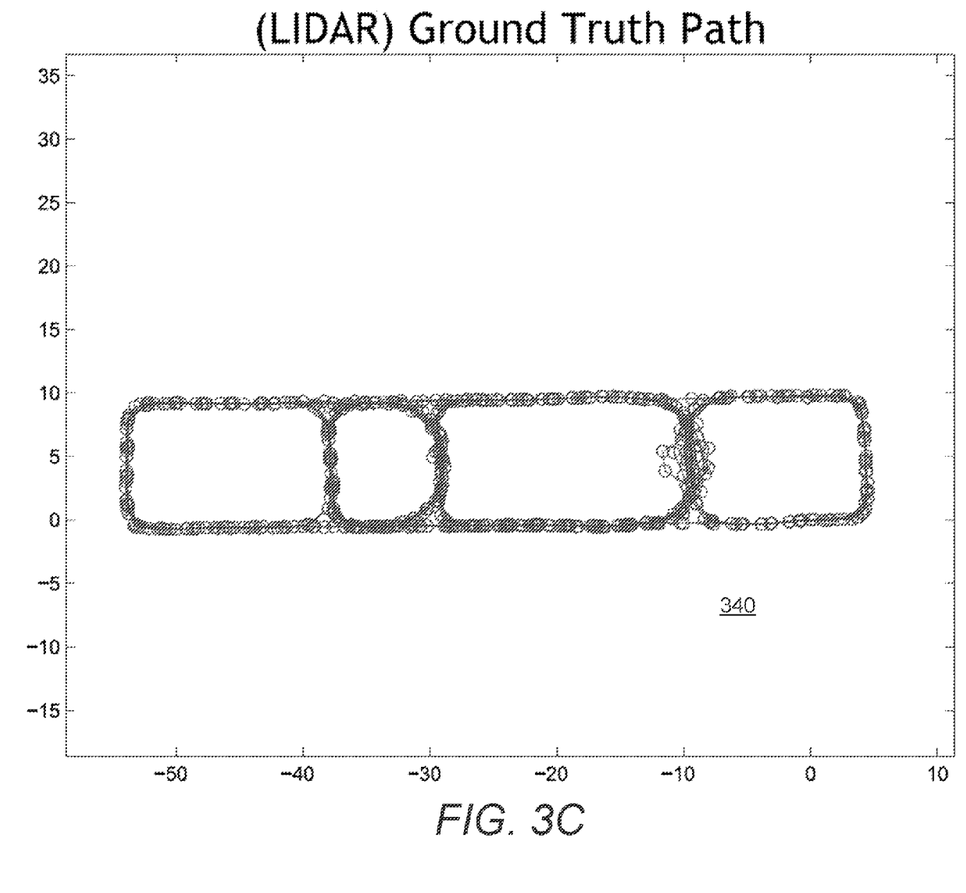

The state space parametrization discussed herein is used. FIG. 3A-C are qualitative visualizations of the performance of the GraphSLAM method according to an embodiment of the present invention. More particularly, shown in FIGS. 3A and 3B are graphs 300 and 302 that compare GraphSLAM initialization (FIG. 3A) and the resulting optimized GraphSLAM posterior (FIG. 3B). For reference, shown in FIG. 3C is graph 304 that is the unaligned ground truth trajectory.

By nature of the sensors, GraphSLAM output is displayed in units of steps; ground truth is plotted in meters. Notice that the results show straight halls, despite the GraphSLAM method containing absolutely no explicit shape prior. This adds further confidence to the notion that signal-strength SLAM can be achieved in a completely unsupervised manner, without relying on trajectory priors.

The sensor used in our experiment measures pedometry in units of steps. The ground truth is collected using a laser-based technique that produces coordinates measured in meters. The location of the nodes in GraphSLAM are in a different reference frame than those in the ground-truth trajectory. To report error in standard units, localization accuracy is computed with a subjective-objective technique: A characterization is made of "how accurately a person detects returning to a previously visited location." For each time $t_i$ during the trajectory, an inferred 'subjective' location $\tilde{\vec{x}}_{t_i}$, from GraphSLAM and a true 'objective' location $\vec{x}^*_{t_i}$, are used for the same timestamp in the ground truth. For every objective location $\vec{x}^*_{t^*_j}$, its 'objective neighbors' are denoted to be those points within r meters of $\vec{x}^*_{t_i}$. For each objective neighbor of $\vec{x}^*_{t^*_j}$, the 'subjective' location $\tilde{\vec{x}}_{t_i}$, has a corresponding 'subjective neighbor' $\tilde{\vec{x}}_{t^*_j}$. The GraphSLAM output is scaled so that the total distance traveled, and define localization error to be the mean of the distance $\|\tilde{\vec{x}}_{t_i} - \tilde{\vec{x}}_{t^*_j}\|_2$ across all pairs $(t_i, t_i^*)$. r has been chosen to be the mean distance traveled between consecutive WIFI scans.

With this metric, in an embodiment of the present invention, a mean localization error of 2.23 meters is achieved. The standard deviation Osborne publication this value is 1.25 m. For comparison, using the same metric, the mean localization error from only pedometry and gyroscope without WIFI is 7.10 m.

Figure 4A:
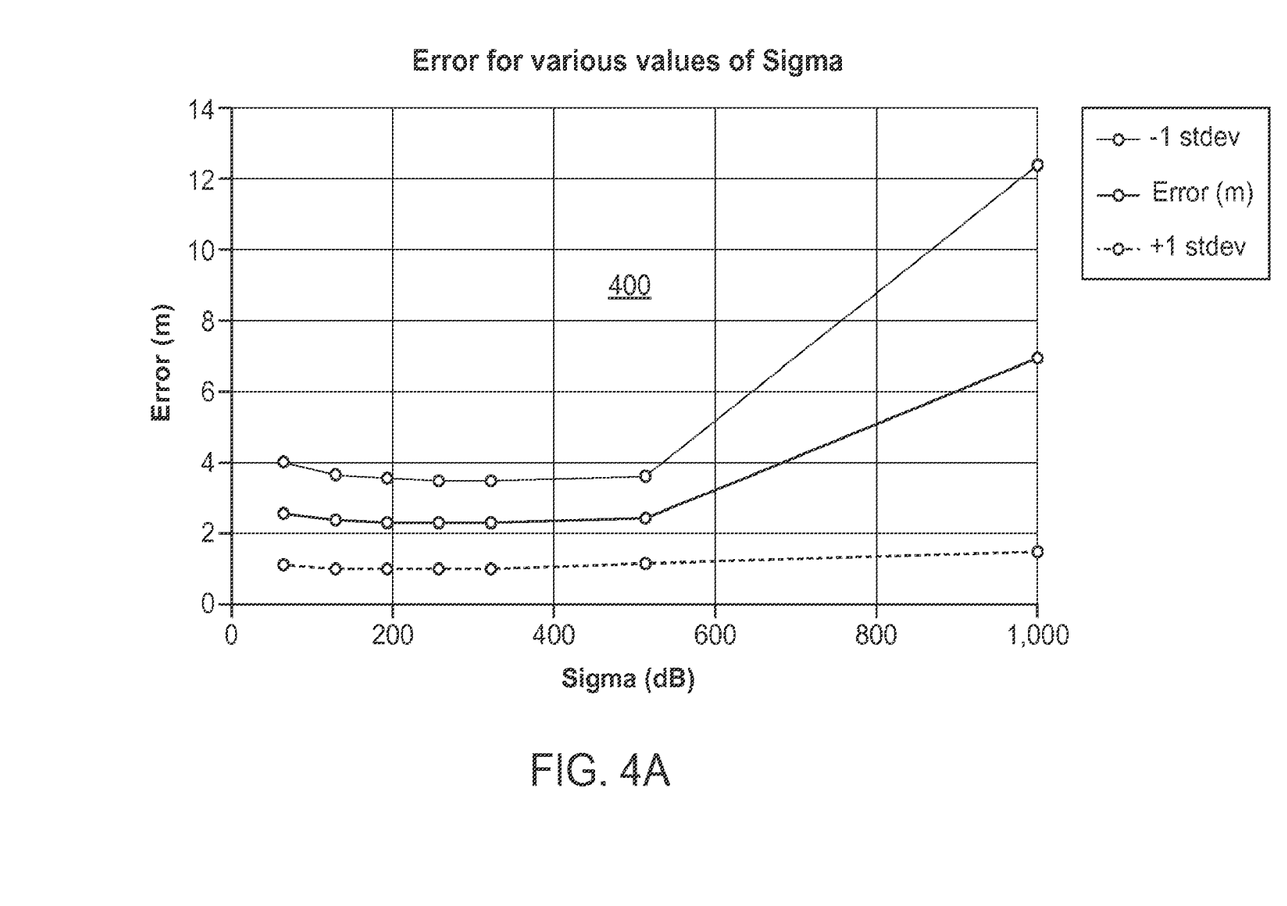
FIGS. 4A and 4B are graphs that shown the mean and standard deviation of the localization error according to an embodiment of the present invention.
Figure 4B:
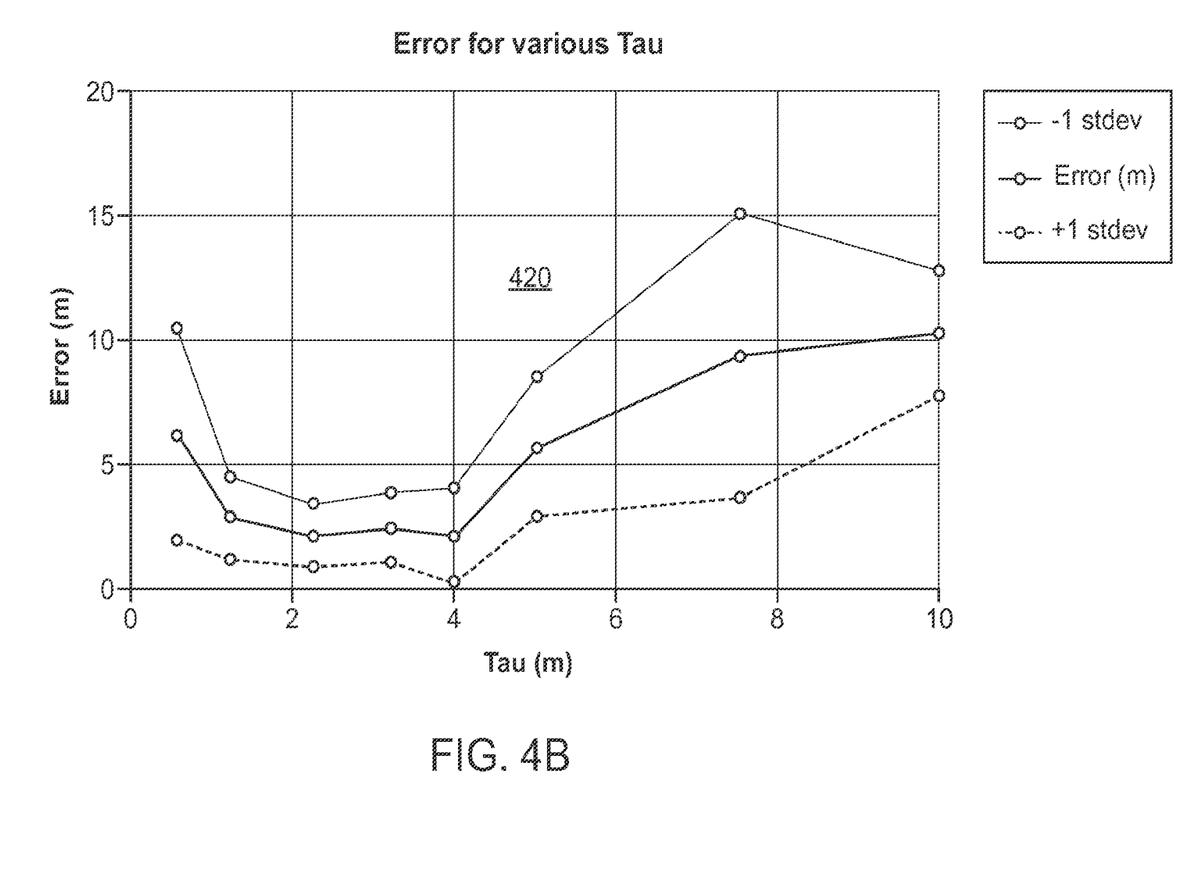

To demonstrate the robustness of an algorithm according to an embodiment of the present invention with respect to parameter selection, FIGS. 4A and 4B are graphs that shown the mean and standard deviation of the localization error according to an embodiment of the present invention. More particularly, shown in FIG. 4A is graph 400 that is shown over a range of values for the Var ($\epsilon^{WiFi}$) parameter. Shown in FIG. 4B is shown over a range of values for the $\tau$ parameter. In graphs 400 and 402, the upper line is +1 standard deviation above the mean, and the lower line is −1 standard deviation below the mean.

The parameter Var($\epsilon^{WiFi}$) which is related to the measurement noise variance associated with the WIFI sensor, can take any value from roughly 50 through 500 dB. Considering that the WIFI measurements themselves only range from about 0 to −90 dB, this implies that this embodiment is very robust against poor Var($\epsilon^{WiFi}$), selection. The parameter $\tau$, which is related to the expected distance to the nearest wall, needs only be accurate to within 3 meters. This also provides confidence that slight errors in $\tau$ will not cause a catastrophic increase in error.

These experiments may represent a lower bound on result quality for this algorithm according to an embodiment of the present invention. As a non-linear least squares problem, in general, benefit is expected from more robust solvers, e.g., Levenberg-Marquardt, simulated annealing, etc. Given that the GraphSLAM framework has been well-studied in the SLAM community, any number of solvers are likely to improve performance or result quality further.

As described above, a signal strength SLAM has been formulated into an instance of GraphSLAM as an embodiment of the present invention. In doing so, scalability has been improved, runtime complexity has been reduced, limitations on WIFI density/richness has been relaxed, and shape priors have been removed. Experimental results on real-world data demonstrate the effectiveness of using GraphSLAM approach to solve this problem. The teaching presented here can be implemented in 3D variants of the WIFI SLAM problem, multi-agent extensions, time-of-arrival/round-trip-time sensor models, improved initialization techniques as well as more specialized solvers as would be obvious to one of ordinary skill in the art upon reading and understanding the present disclosure.

It should be appreciated by those skilled in the art that the specific embodiments disclosed above may be readily utilized as a basis for modifying or designing other image processing algorithms or systems. It should also be appreciated by those skilled in the art that such modifications do not depart from the scope of the invention as set forth in the appended claims.

What is claimed is:

1. A computer-implemented method for localization using signal-strength measurements, comprising:
   obtaining a set of signal-strength measurements using a wireless interface transmitted by a set of signal sources distributed within a sparse geographic distribution;
   performing simultaneous localization and mapping computations on the set of signal-strength measurements using at least one processor configured by executable software stored in memory by:
      estimating locations in which each of the signal-strength measurements in the set of signal-strength measurements was obtained;
      interpolating a signal-strength estimate in each of the estimated locations based upon the signal-strength measurements from the set of signal-strength measurements obtained at each of the estimated locations, where the interpolation of the signal-strength estimate in each of the estimated locations excludes its corresponding signal-strength measurement from the set of signal-strength measurements; and
      updating the estimated locations in which each of the signal-strength measurements in the set of signal-strength measurements was obtained based on at least an error between the estimated signal-strength at the estimated locations and the signal-strength measurements; and
   computing a trajectory from the simultaneous localization and mapping computations.

2. The computer-implemented method of claim 1, wherein at least one signal source in the set of signal sources is a WIFI source.

3. The computer-implemented method of claim 1, wherein the set of signal-strength measurements comprises two substantially similar signal-strength measurements.

4. The computer-implemented method of claim 1, further comprising receiving motion measurements using an inertial measurement unit.

5. The computer-implemented method of claim 1, further comprising computing a map of the estimated locations in which each of the signal-strength measurements in the set of signal-strength measurements was obtained using at least one processor configured by executable software stored in memory.

6. A computing device comprising:
a data bus;
memory coupled to the data bus and containing executable software;
at least one processor coupled to the data bus; and
a wireless interface configured to obtain a set of signal strength measurements and communicate with the processor via the data bus;
wherein the at least one processor is configured by the executable software to:
obtain a set of signal-strength measurements from the wireless interface transmitted by a set of signal sources distributed within a sparse geographic distribution; and
perform simultaneous localization and mapping computations on the set of signal-strength measurements by:
estimate locations in which each of the signal-strength measurements in the set of signal-strength measurements was obtained;
interpolate a signal-strength estimate in each of the estimated locations based upon the signal-strength measurements from the set of signal-strength measurements obtained at each of the estimated locations, where the interpolation of the signal-strength estimate in each of the estimated locations excludes its corresponding signal-strength measurement from the set of signal-strength measurements;
update the estimated locations in which each of the signal-strength measurements in the set of signal-strength measurements was obtained based on at least an error between the estimated signal-strength at the estimated locations and the signal-strength measurements; and
compute a trajectory from the simultaneous localization and mapping computations.

7. The computing device of claim 6, wherein the wireless interface further comprises a cellular telephone.

8. The computing device of claim 6, wherein the wireless interface further comprises a tablet computer.

9. The computing device of claim 6, wherein the sparse geographic distribution is indoors.

10. The computing device of claim 6, further comprising receiving motion measurements using an internal measurement unit.

11. The computing device of claim 6, further comprising receiving motion measurements using a gyroscope.

12. The computing device of claim 6, further comprising receiving motion measurements using a pedometer.

13. The computing device of claim 6, wherein the wireless interface is a WIFI transceiver.

14. The computing device of claim 6, wherein interpolating the signal-strength estimate in each of the estimated locations further comprises using Gaussian interpolation weights.

15. The computing device of claim 14, wherein the Gaussian interpolation weights are determined using the following expression:

$$\exp\left(-\frac{1}{2\tau^2}\|\vec{x}_{t_i} - \vec{x}_{t_j}\|_2^2\right)$$

where $\tau$ is a scale parameter, $\vec{x}_{t_i}$ is a position from which a signal-strength measurement is made at time $t_i$ and $\vec{x}_{t_j}$ is a position from which a signal-strength measurement is made at time $t_j$.

16. The computing device of claim 15, wherein $\tau$ is learned from training data.

17. The computing device of claim 15, wherein $\tau$ is fixed.

18. The computing device of claim 6, further comprising sensors that obtain heading and distance measurements.

19. The computing device of claim 18, wherein updating the estimated locations in which each of the signal-strength measurements in the set of signal-strength measurements was obtained comprises minimizing a negative log likelihood of observed sensor measurement given each of the estimated locations in which a set of observed sensor measurements comprising a heading measurement, a distance measurement, and a signal-strength measurement was obtained.

20. The computing device of claim 19, wherein the negative log likelihood of the observed sensor measurements given the estimated locations in which each set of sensor measurements was obtained is:

$$-\log \prod_i Pz_i(z_i \mid X) = \frac{1}{2}\sum_i [z_i - h_i(X)]^T [\mathrm{Var}(\varepsilon_i)]^{-1} [z_i - h_i(X)]$$

where $z_i$ is a given set of sensor measurements,
X is a vector representing the locations at which each of the sets of sensor measurements was obtained,
$h_i(X)$ is a function that generates the expected set of sensor measurements corresponding to $z_i$ given X,
$\epsilon_i$ is a parameter characterizing sensor noise, and
$z_i - h_i(X)$ is the error between an expected sensor measurement given X and the signal-strength measurement $z_i$.

21. The computing device of claim 20, wherein minimizing the negative log likelihood of observed sensor measurements given each of the estimated locations in which a set of observed sensor measurements was obtained comprises utilizing a non-linear least squares solver problem.

22. The computing device of claim 20, wherein minimizing the negative log likelihood of observed sensor measurements given each of the estimated locations in which a set of observed sensor measurements was obtained further comprises solving:

$$X_{new} := X_0 + \left[\sum_{h_i} J_{h_i}^T \Omega_{h_i} J_{h_i}\right]^{-1} \left[\sum_{h_i} J_{h_i}^T \Omega_{h_i}(z_i - h_i(X_0))\right]$$

where $J_{h_i}$ is the derivatives of with respect to each state variable in $X_0$, and $\Omega_{h_i} = [\mathrm{Var}(\epsilon_i)]^{-1}$.

23. The computing device of claim 22, wherein $j_{h_i}(x) = \nabla h_i$ and $\Omega_{h_i} = \tau_\epsilon^{-2}$, and where $x_{new} := x_0[\Sigma_{h_i} J_{h_i}^T \Omega_{h_i} J_{h_i}]^{-1}[\Sigma_{h_i} J_{h_i}^T \Omega_h^i (z_i - h_i(X_0))]$ is solved by solving the overconstrained matrix system of:

$$\begin{bmatrix} -\sigma_{h_1}^{-1} \nabla h_1 - \\ -\sigma_{h_2}^{-1} \nabla h_2 - \\ \vdots \\ -\sigma_{h_N}^{-1} \nabla h_N - \end{bmatrix} \vec{\Delta} = \begin{bmatrix} \sigma_{h_1}^{-1}(z_1 - h_1) \\ \sigma_{h_2}^{-1}(z_2 - h_2) \\ \vdots \\ \sigma_{h_N}^{-1}(z_N - h_N) \end{bmatrix}$$

and updating $X_{new}:=X_0+\vec{V}$.

24. The computing device of claim 23, wherein $\nabla h_i$ is solved for headings $\{\phi_1, \phi_2, \ldots, \phi_N\}$ and distances $\{d_1, d_2, \ldots, d_{N-1}\}$ between each signal-strength measurement as $h_{distance}(X)=d_i$, and $h_{heading}(X)=\phi_{i+1}-\phi_i$.

25. The computing device of claim 23, wherein $\nabla h_1$ is solved for signal-strength by computing the derivatives:

$$\nabla_{\{\vec{d},\vec{\phi}\}} h_{WiFi}(X) = [\nabla_{\{\vec{x}\}} h_{WiFi}(X)] J_{\{\vec{x}\}}(\{\vec{d},\vec{\phi}\})$$

$$\text{where } \nabla_{\{\vec{x}\}} h_{WiFi}(X) = \sum_j [\vec{\beta_t}]_j (z_j - h_i) \frac{-1}{2\tau^2} (\nabla_{\{\vec{x}\}} \|\vec{x_j} - \vec{x_i}\|^2).$$

\* \* \* \* \*